April 12, 1966 R. L. MORRIS ET AL 3,245,630

CARTRIDGE FOR ENDLESS TAPE

Filed Sept. 13, 1961 2 Sheets-Sheet 1

INVENTOR.
RICHARD L. MORRIS
HARLEE A. ANDERSON
BY
Merchant, Merchant & Gould
ATTORNEYS INVENTOR.
RICHARD L. MORRIS
HARLEE A. ANDERSON
BY
Merchant, Merchant & Gould
ATTORNEYS 3,245,630

CARTRIDGE FOR ENDLESS TAPE

Richard L. Morris and Harlee A. Anderson, both of Minneapolis, Minn., assignors to Viking of Minneapolis, Minneapolis, Minn., a corporation of Minnesota Filed Sept. 13, 1961, Ser. No. 137,826
10 Claims. (Cl. 242—55.19)

This invention relates generally to tape recording and play back instruments, and more particularly it relates to an improved endless tape cartridge for use with such instruments.

For certain uses, it has become increasingly common to use magnetic tape cartridges of the type having an endless coil of tape in which a playing loop thereof is removed from the inside of the coil and returned to the perimeter thereof. Generally, the tape cartridges contain a reel upon which the coil of tape is wound for free rotation about a generally vertical axis. With such an arrangement, each of the convolutions of the coil of tape is rotating or slipping relative to the adjacent convolutions thereof, during the continual generally radially inwardly movement of the tape convolutions, and this has resulted in operation problems, such as the tape convolutions, particularly the inner ones thereof, binding or sticking with one another so as to hinder the smooth and efficient operation of the device. Several attempts have been made to solve this and other ancillary problems, but none of them have been entirely satisfactory. Therefore, it is an object of this invention to provide a core structure for the reel of an endless tape cartridge which is constructed so that, upon rotation of the reel, the inner convolutions of the tape coil which are generally adjacent the core structure are continually elevated or raised a slight amount so as to prevent binding or sticking therebetween.

Another problem results from the use of reel hubs or core structures having generally circular and concentric lower flange portions upon which the radially inwardly moving convolutions of the tape coil tend to bind or catch during operation of the device. In this connection, it is an object of this invention to provide an endless tape cartridge having a core structure which is designed and constructed so as to prevent the immediately above referred to undersirable binding of the tape convolutions and the resulting ineffective operation of the device, and which does so by providing a circular generally disk-like flange, the eccentric edge of which, as the core structure rotates, moves relatively radially inwardly and outwardly with respect to the adjacent generally concentric convolutions of the coil of tape so that said convolutions are continually riding upon and falling off of the disk-like flange whereby to slightly elevate or raise the convolutions of the tape coil adjacent the core structure.

Another object of this invention is the provision of a thin flat bearing ring for use in combination with the above noted core structure for reducing friction between the core structure and the turntable and for reducing the wear thereof.

Another object of this invention is the provision of a core structure which is designed and constructed with a fillet portion at the junction of the annular inner portion thereof and the disk-like horizontal flange portion thereof so as to aid in lifting a portion of the inner convolution of the tape from the inclinded peripheral surface of the annular inner portion of the core structure.

A still further object of this invention is the provision of an improved endless tape cartridge which is designed and constructed so as to prevent tape fouling, and which properly controls and contains the tape so as to permit the efficient operation of the device. This invention also provides an exceedingly simple and convenient assembly which lends itself to economical production.

The above and still further objects of this invention will become apparent from the following detailed specification, appended claims and attached drawings.

Referring to the drawings, wherein like reference characters indicate like parts or elements throughout the several views.

Figures 1, 2:
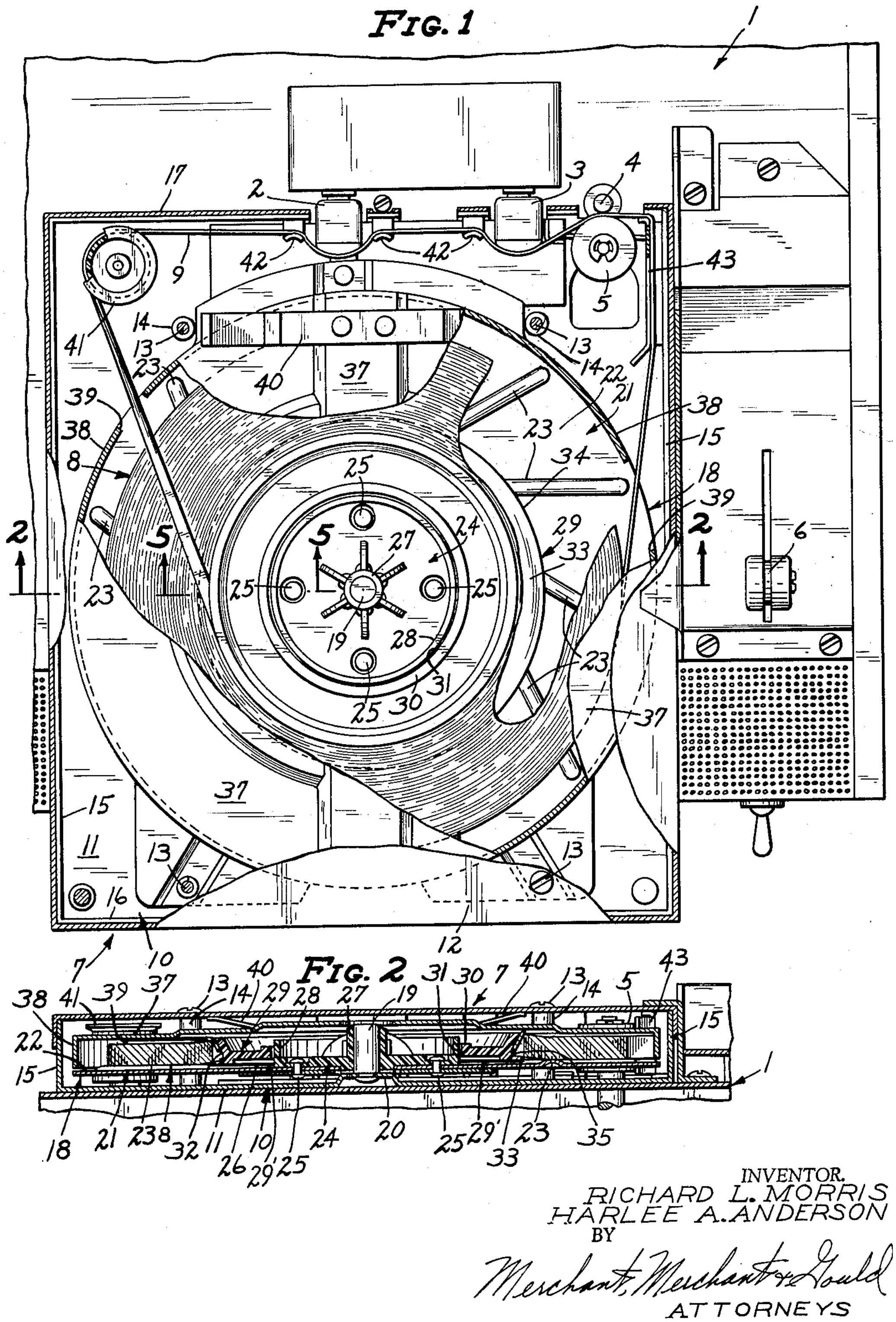
FIG. 1 is a view in top plan of this invention, and showing the same operatively positioned on a tape handling machine.
FIG. 2 is a view in vertical section taken on the line 2—2 of FIG. 1, some parts being broken away.
Figure 3:
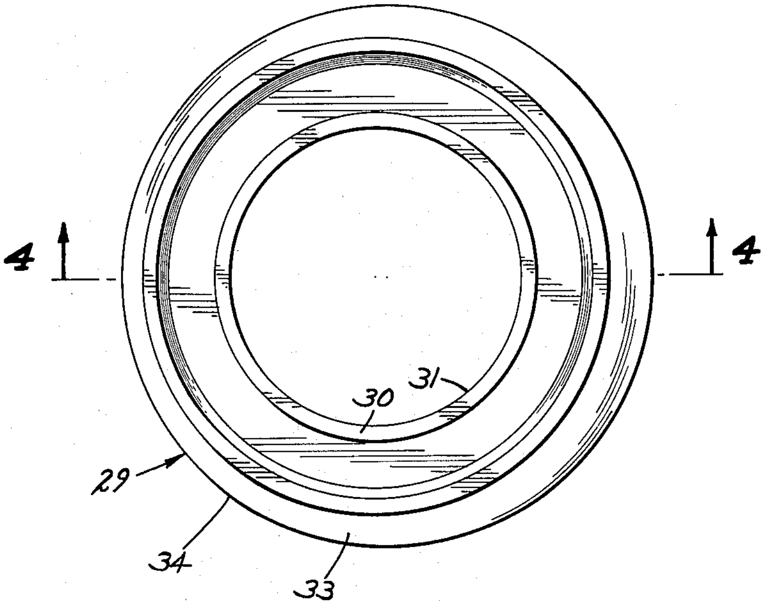
FIG. 3 is an enlarged view in top plan of the core structure of this invention.

Referring to the drawings, and particularly to FIG. 1 thereof, an electromagnetic tape handling machine, herein referred to as a tape deck, is represented generally by the reference numeral 1. The tape deck 1 includes a commercially available electromagnetic erase head 2, a recording and/or play back head or transducer 3, a power driven capstan 4 for driving a loop of the endless coil of tape when the same is engaged by a retractable pressure roller 5. The pressure roller 5 is movable between its upper operative position shown in FIG. 1 and a retracted below-deck lower position, not shown, by suitable operating means, represented at 6. Since this invention does not reside in the tape deck instrument 1, further showing and description thereof will be omitted. This invention resides in improvements in an endless tape cartridge, represented in its entirety by the reference numeral 7, the same being of the type having an endless coil of tape 8 in which a playing loop 9 thereof is removed from the inside of the coil by the pulling action of the power driven capstan 4 and is returned to the perimeter of the freely rotating coil 8. The tape cartridge 7 comprises a box or housing, represented generally by the reference numeral 10, which includes a bottom wall 11 and a top wall 12 which is removably secured in vertically spaced generally parallel relationship with the bottom wall 11 by means of screws 13 which are received within vertically aligned studs 14. The housing 10 further includes side walls 15, a front wall 16 and a back wall 17. It will be noted that portions of the back wall 17 are cut away in a generally conventional manner so as to permit reception of the erase and transducer heads 2, 3 and the capstan 4.

The cartridge 7 further comprises a reel 18 mounted within the housing 10 on a generally centrally disposed vertically extending spindle 19 which is rigidly secured in an impressed portion 20 of the bottom wall 11, as shown particularly in FIG. 2. The reel 18 comprises a circular turntable 21 which is carried for generally free rotation about the spindle 19. The turntable 21 defines an upper surface 22 for supporting at least a portion of the endless coil of tape 8, the upper surface 22 having for this purpose a plurality of angularly outwardly extending ribs 23. The reel 18 further includes an annular hub 24 which is rigidly secured, as by rivets 25, to the turntable 21 and also to an annular base plate 26 positioned in underlying relationship to the turntable 21. The annular hub 24 comprises an inner bearing portion 27 rotatably received on the spindle 19 and a cylindrical outer portion 28.

In accordance with this invention, the reel 18 further comprises an annular core structure, represented generally by the reference numeral 29, which is loosely received on the annular hub 24. The core structure is sometimes referred to herein as a core ring or a hub ring. A thin flat generally disk-like bearing ring 29' is interposed between the turntable 21 and the core structure 29. The bearing ring 29' is generally circular in form and may be suitably formed from a plastic material, such as Teflon, and is concentrically positioned with respect to the turntable 21. The bearing ring 29' reduces the friction between the turntable 21 and the core structure 29, and also adds wearing life to the turntable 21 and the core structure 29.

The core structure 29 may be suitably and economically formed from a plastic material, and the same comprises an upstanding annular hub or annular inner portion 30 which defines an inner generally vertically extending generally cylindrical surface 31 which is of a slightly greater diameter than the cylindrical outer portion 28 of the annular hub 24, the inner surface 31 of the core structure 29 being therefore loosely and generally concentrically received about the cylindrical outer portion 28 of the annular hub 24, as shown particularly in FIGS. 1 and 2. It is noted that the annular inner portion 30 of the core structure 29 is recessed at the top thereof and also defines a generally upwardly and outwardly inclined generally frusto-conical surface 32 about which the coil of tape 8 is wound. The core structure 29 further comprises a generally circular disk-like flange 33 which extends horizontally outwardly from the annular inner portion 30 of the core structure 29, the bottom surface of the disk-like flange 33 being disposed adjacent the upper surface 22 of the turntable 21.

Figures 4, 5:
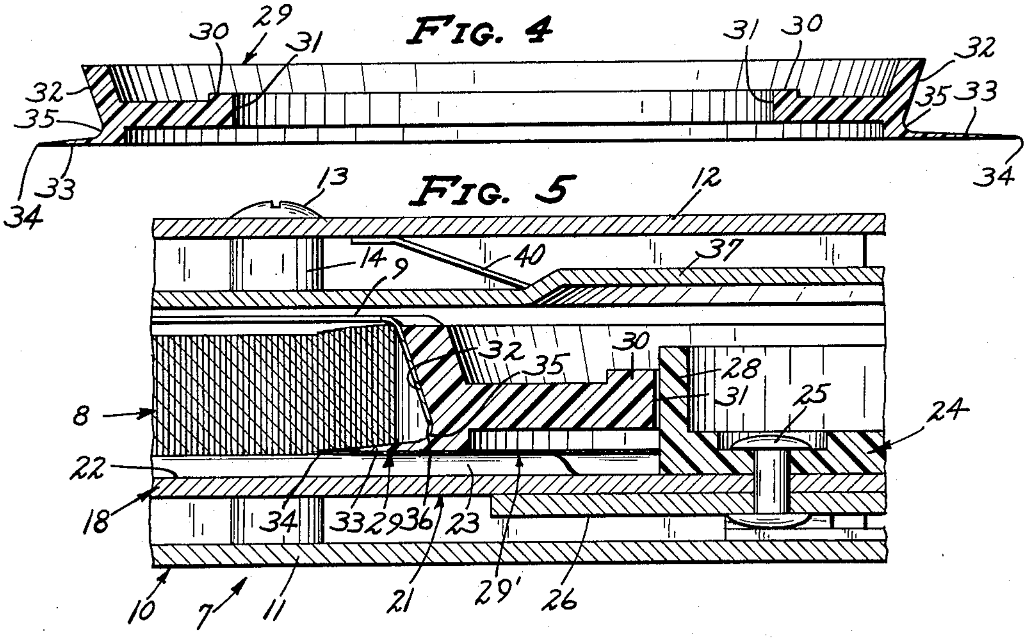
FIG. 4 is a further enlarged view in vertical section taken on the line 4—4 of FIG. 3.
FIG. 5 is a greatly enlarged view in vertical section taken on the line 5—5 of FIG. 1.

As seen particularly in FIG. 5, the inner convolutions of the coil of tape 8 rest upon the upper surface of the disk-like flange 33 of the core structure 29. As noted in the above introductory comments, it often times happens with respect to the type of tape cartridge disclosed herein that the convolutions of the coil of tape, and particularly the inner ones thereof, bind against one another so as to result in improper operation. In light of this fact, the disk-like flange 33 of the core structure 29 is formed so that the outer peripheral generally circular edge 34 thereof is eccentric with respect to the annular inner portion 30 of the core structure 29 and also eccentric with respect to the turntable 21, said circular edge 34 also being disposed in relatively widely inwardly spaced relationship to the periphery of the turntable 21. It is noted that the core structure 29 is free to rotate relative to the rotating turntable 21, and sometimes does so; however, since the core structure 29 is supported by the turntable 21, the core structure 29 also rotates relative to the rotating tape coil 8. Therefore, it should be obvious that the core structure 29 is disposed and adapted to rotate relative to the rotating turntable 21 and the rotating coil of tape 8 whereby the eccentric flange 33 of the core structure 29, as it rotates, moves relatively radially inwardly and outwardly with respect to the adjacent generally concentric convolutions of the coil of tape 8 so as to slightly raise or elevate the convolutions of the tape coil 8 which are disposed adjacent the core structure 29. Therefore, it will be appreciated that such continual elevating or lifting of the inner convolutions of the coil of tape 8 which are adjacent to the eccentric flange 33 of the core structure 29 serves to effectively prevent any binding or sticking between the adjacent convolutions of the tape coil 8. It is therefore noted that the core structure or core ring 29 is sometimes broadly referred to herein as means engaging inner convolutions of the tape for reciprocating same axially relative to one another on the reel. It is noted that the circular edge 34 of the disk-like flange 33 of the core structure 29 is feathered so as to permit the same to move with relative ease inwardly and outwardly under the convolutions of the tape coil 8.

When tape cartridges of the general type disclosed herein employ the structure having a concentric disk-like flange, it often happens that the inwardly moving convolutions of the tape coil catch on the concentric circular edge of the flange and cause fouling and improper operation of the coil of tape. Therefore, an ancillary advantage and benefit of the eccentric circular construction of the disk-like flange 33 of this invention is that the relative radial inward and outward movement thereof with respect to the convolutions of the tape coil 8 upon rotation of the core structure 29 permits the convolutions of the coil of tape 8 which are adjacent the circular edge 34 of the flange 32 to continually and intermittently ride up on the generally radially inwardly and outwardly moving flange 33. This feature of the core structure 29 is shown particularly in FIG. 5.

Referring again to FIG. 5, it will be noted that the playing loop 9 of the tape coil 8 is removed from the inclined surface 32 of the core structure 29 and passes over the tape coil 8. In order to aid in the upward advancement and removal of a portion of the innermost convolution of the tape coil 8 with respect to the inclined surface 32 of the annular inner portion 30 of the core structure 29, a generally arcuate fillet 35 is defined by the core structure 29 at the junction of the annular inner portion 30 thereof and the disk-like horizontal flange 33 thereof. As shown particularly in FIG. 5, before being removed from the core structure 29, the bottom edge 36 of a portion of the innermost convolution of the tape coil 8 rides up the arcuate fillet 35 of the core structure 29 so that the same may be easily thereafter lifted from around the inclined surface 32 of the core structure 29.

As shown in FIGS. 1, 2 and 5, a generally circular cover plate 37 is secured on the studs 14 and covers the concentric convolutions of the tape coil 8. The cover plate 37 defines a depending side wall 38 having openings 39 to permit the exit and re-entry of the playing loop 9 of the tape coil 8. The cover plate 37 is downwardly biased by generally horizontally disposed leaf spring 40 which is engaged by the top wall 12 of the housing 10. The playing loop 9 of the tape coil 8 upon leaving the reel 18 passes around a pulley 41 and is then guided by tape guides 42 past the erase and transducer heads 2, 3 and the capstan 4, and the playing loop 9 is then guided by the corner guide 43 back to the peripheral convolution of the tape coil 8, it being understood that the capstan 4 in pulling the tape from the innermost convolution of the tape coil 8 causes the turntable 21 to rotate so that the slack in the returning portion of the playing loop 9 is automatically retrieved. In light of the above detailed description of this invention, it is believed that further comment with respect to the operation thereof is unnecessary.

This invention has been thoroughly tested and found to be completely satisfactory for the accomplishment of the above objects; and while we have shown and described above a preferred embodiment thereof in which the principles of the present invention have been incorporated, we wish it to be specifically understood that the same may be modified without departure from the scope and spirit of the appended claims.

What we claim is:

1. In a tape cartridge of the type having an endless coil of tape in which a playing loop thereof is removed from the inside of the coil and returned to the perimeter thereof, a cartridge housing having spaced top and bottom walls and side walls, a reel mounted within said housing, said reel comprising a turntable mounted for free rotation about a generally vertical axis and having an upper surface for supporting at least a portion of the endless coil of tape, said reel also comprising an annular hub rigidly secured to the top surface of said turntable in generally concentric relationship therewith and for rotation therewith, and said reel further comprising an annular core structure loosely received on said hub, said core structure comprising an upstanding annular inner portion having a generally upwardly and outwardly inclined surface about which said coil of tape is wound, and a disk-like flange extending horizontally outwardly from said annular inner portion of said core structure and disposed adjacent the upper surface of said turntable, said disk-like flange having a peripheral generally circular edge which is eccentric with respect to said inner portion of said core structure and said turntable and is also disposed inwardly of the periphery of said turntable, said disk-like flange having an upper surface for supporting the inner convolutions of said coil of tape, and said core structure being disposed and mounted to rotate relative to said rotating turntable and said rotating coil of tape whereby said eccentric flange of said core structure as it rotates moves relatively radially inwardly and outwardly under the adjacent generally concentric convolutions of said coil of tape to slightly elevate the convolutions of the tape adjacent the core structure.

2. The structure defined in claim 1 in which said core structure also comprises a fillet at the junction of said annular portion thereof and said disk-like horizontal flange thereof which is adapted to aid in the removal of a portion of the inner convolution of the tape from said inclined peripheral surface of said annular inner portion of the core structure.

3. The structure defined in claim 2 in which said fillet is generally arcuate.

4. In a tape cartridge of the type having an endless coil of tape in which a playing loop thereof is removed from the inside of the coil and returned to the perimeter thereof, a cartridge housing having spaced top and bottom walls and side walls, a reel mounted within said housing, said reel comprising a turntable mounted for free rotation about a generally vertical axis and having an upper surface for supporting at least a portion of the endless coil of tape, said reel also comprising an annular hub rigidly secured to the top surface of said turntable in generally concentric relationship therewith and for rotation therewith, said reel further comprising an annular core structure loosely received on said hub, said core structure comprising an upstanding annular inner portion having a generally upwardly and outwardly inclined surface about said coil of tape is wound, and a disk-like flange extending horizontally outwardly from said annular inner portion of said core structure and disposed adjacent the upper surface of said turntable, said disk-like flange having a peripheral generally circular edge which is eccentric with respect to said inner portion of said core structure and said turntable and is also disposed inwardly of the periphery of said turntable, said disk-like flange having an upper surface for supporting the inner convolutions of said coil of tape, and said core structure being disposed and mounted to rotate relative to said rotating turntable and said rotating coil of tape whereby said eccentric flange of said core structure as it rotates moves relatively radially inwardly and outwardly under the adjacent generally concentric convolutions of said coil of tape to slightly elevate the convolutions of the tape adjacent the core structure, and said reel further comprising a thin flat generally disk-like bearing ring interposed between and in engagement with the upper surface of the turntable and said core structure for reducing the friction between the turntable and the core structure.

5. An endless magnetic tape cartridge comprising a box, a reel rotatably mounted in the box, an endless tape wound on the reel, and means engaging inner convolutions of the tape for reciprocating same axially relative to each other on the reel to prevent binding or sticking therebetween.

6. A cartridge as in claim 5 wherein said means comprises an eccentric tapered ring surface underlying the inner convolutions of the tape.

7. A reel comprising a turntable having an upper surface, a hub extending therefrom, and a tapered ring supported on the said surface for rotation about the hub and eccentric with respect to the hub and having a radially tapering feather edge.

8. A core ring comprising an annular hub, an eccentric tapered ring having a feather-edge laterally displaced from one side of the hub, and an inclined flange having a frusto-conical surface secured on the outer radial portion of the hub.

9. An endless magnetic tape cartridge comprising a box, a reel rotatably mounted in said box, a hub ring mounted on said reel and adapted to rotate independently thereof, and a tapered flange radially extending from and eccentric with respect to said hub ring and adapted to rotate therewith relative to said reel.

10. An endless magnetic tape cartridge comprising:
a box;
a reel rotatably mounted in said box;
a hub ring mounted on said reel and adapted to rotate independently thereof;
a flange radially extending from said hub ring and adapted to rotate therewith, wherein said flange is characterized by an outer edge of varying radial distance from the center of the hub ring; the outer edge of said flange being generally circular and eccentric with respect to the axis of said reel.

References Cited by the Examiner

UNITED STATES PATENTS

| | | | |
|---|---|---|---|
| 1,491,575 | 4/1924 | Wilson | 242—55.19 X |
| 2,837,332 | 6/1958 | Busch | 242—55.19 |
| 2,922,642 | 1/1960 | Cousino | 242—55.19 |
| 2,951,654 | 9/1960 | Steelman | 242—55.19 X |
| 3,030,041 | 4/1962 | Cousino | 242—55.19 |

FOREIGN PATENTS

| | | |
|---|---|---|
| 172,600 | 1922 | Great Britain. |

MERVIN STEIN, *Primary Examiner.*

STANLEY N. GILREATH, HARRISON R. MOSELY, RUSSELL C. MADER, *Examiners.*

J. C. GARVIN, B. S. TAYLOR, *Assistant Examiners.*